United States Patent [19]

Muir

[11] 3,963,618

[45] June 15, 1976

[54] NOVEL POLYMER MEMBRANES FOR REVERSE OSMOSIS

[75] Inventor: William McClements Muir, Gartmore, England

[73] Assignee: Babcock & Wilcox Limited, London, England

[22] Filed: July 25, 1974

[21] Appl. No.: 491,852

[52] U.S. Cl. .................. 210/500 M; 260/73 R; 260/73 L; 260/29.6 B; 264/41; 264/216; 526/9; 526/266
[51] Int. Cl.² .................. B01D 39/00; B01D 39/14
[58] Field of Search............ 260/73 R, 73 L, 29.6 B, 260/91.3 VA; 264/216; 210/500 M

[56] References Cited
UNITED STATES PATENTS

| | | | |
|---|---|---|---|
| 2,326,048 | 8/1943 | McNally et al. | 260/73 L |
| 2,387,833 | 10/1945 | Dahle | 260/73 L |
| 2,915,504 | 12/1959 | Berardinelli | 260/73 L |
| 2,981,718 | 4/1961 | Heckmaier et al. | 260/73 L |
| 3,170,869 | 2/1965 | Imoto | 260/73 L X |
| 3,907,675 | 9/1975 | Chapurlat et al. | 210/500 M X |

Primary Examiner—Lucille M. Phynes
Attorney, Agent, or Firm—Kemon, Palmer & Estabrook

[57] ABSTRACT

This case is directed to the preparation of polyvinyl acetal resins as semi-permeable membranes for use in the treatment of feed solutions by reverse osmosis, ultrafiltration or related techniques.

7 Claims, No Drawings

NOVEL POLYMER MEMBRANES FOR REVERSE OSMOSIS

This invention relates to a series of organic polymers which, when cast in the form of membranes, are useful in the fields of osmosis, reverse osmosis, ultra-filtration and related techniques.

In different aspects the invention includes the new polymers and methods of making them, membranes incorporating the polymers and methods for making them, apparatus utilising the new membranes for liquid purification and separation, and methods of so treating liquids.

The new polymers of this invention are related to polyvinyl acetal type resins, which in turn are derivatives of polyvinyl alcohol.

Polyvinyl alcohol is named as if it were a polymerised form of the theoretical monomer, vinyl alcohol. However, this monomer does not exist in a stable form and so polyvinyl alcohol is made by hydrolysis of a polyvinyl ester, and the most usual route is by acid or alkaline hydrolysis of polyvinyl acetate. Polyvinyl acetate can be made by direct polymerisation of vinyl acetate.

Because the polymers polyvinyl acetate and polyvinyl alcohol are starting compounds in the preparation of the novel polymers of this invention, a brief review of their relevant properties is helpful to an understanding of the chemistry of this invention.

Polyvinyl acetate is a term used to collectively cover a whole range of polymers of varying molecular weight according to the number of vinyl acetate units joined together. The polymers range from viscous liquids through a series of low-melting-point soft solids to tough horny materials. They are usually insoluble in water and the lower alcohols (except methanol), though certain mixed aqueous/alcoholic solutions and also various esters and carboxylic acids as well as miscellaneous other organic solvents will dissolve them.

The polyvinyl acetate molecules have a backbone chain of formula (I).

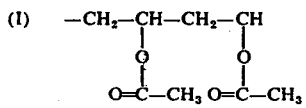

(I)

When polyvinyl acetate is hydrolysed, the acetate groups are replaced by hydroxy groups giving a backbone chain of formula (II).

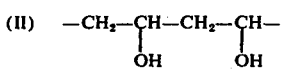

(II)

and an overall formula

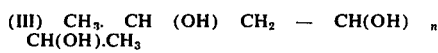

(III)

where n+2 is the number of vinyl monomers in the polymer chain.

However, it will be appreciated that this is an idealised formula, as complete hydrolysis may not occur and some acetoxy groups may remain attached to the chain. Also the end groups may be other than methyl groups, depending on the polymerisation technique.

Polyvinyl alcohols can range in molecular weight from about 4,000 (corresponding to a chain where n is about 100) to several million but the commercially available polyvinyl acetates range in molecular weight from 25,000 to 2,000,000. The properties of polyvinyl alcohol vary according to the grade chosen but in general polyvinyl alcohol is a water soluble material, the lower molecular weight materials being more soluble than the highly polymerised forms, and for any given polymer chain length the more hydrolysed forms being more soluble than the forms containing many residual acetoxy groups. Certain alcohols and aqueous alcohols are also solvents for polyvinyl alcohol but it is not soluble in a wide range of common organic solvents.

Chemically polyvinyl alcohol is a polyhydric alcohol having, at least in the idealised fully hydrolysed structure as shown in formulae II and III, a free hydroxy group on each alternate carbon atom of a polymethylene chain. It will react as an alcohol and will form acetals with an aldehyde. The general scheme of the reaction is a condensation between an aldehyde RCHO (Formula IV) and a unit of the polyvinyl alcohol molecule comprising a 2, 4-dihydroxy-tetramethylene group (formula II) that is to say two adjacent groups -CH.CH(OH)-, to produce a unit of polymer chain containing a cyclic gem diether group of Formula (V)

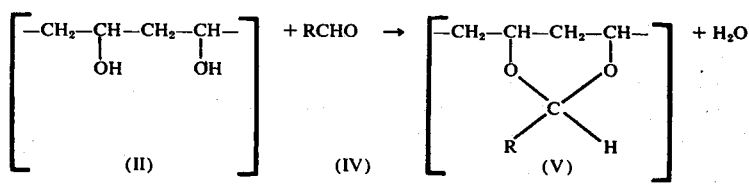

wherein R is an organic group such as an aliphatic radical.

Such products, collectively called polyvinylacetal resins, are already known, for example, polyvinyl formal (R is hydrogen) is used as a hard coating for wires, polyvinyl acetal itself, also called polyvinyl ethylal in Russian sources, (R is methyl) is used to make injection moulded articles such as tooth brush handles, and polyvinyl butyral (R is propyl) is used as one of the ingredients in the plastics interlayer in safety glass.

We have found that when polyvinyl alcohol is reacted with a mixture of two aldehydes or is reacted with one aldehyde in sub-stoichiometrically equivalent quantity and then further reacted with a different aldehyde, useful polymers are formed which have desirable properties in the formation of semi-permeable and ultrafiltration membranes.

Although polyvinyl formal-acetal is known, it is believed that the higher members of the series (regarding the side groups $R^1$ and $R^2$ as the determinants in this respect) where both $R^1$ and $R^2$ contain carbon atoms or when one is a hydrogen atom and the other contains two or more carbon atoms, are novel compounds and the name polyvinyl co-acetal resins will be used for them. This invention includes in one aspect these novel compounds and method of preparing them. However, to the best of our knowledge the polyvinyl co-acetal resins including the known member have never been proposed for the production of semi-permeable membranes useful in the field of reverse osmosis, ultrafiltration and related techniques and in another aspect this invention provides semi-permeable membranes made from any polyvinyl co-acetal resin and methods for preparing them.

When polyvinyl alcohol is reacted with two different aldehydes $R^1CHO$ and $R^2CHO$, any one unit of formula V of the resulting polymer chain may contain $R^1$ or $R^2$ depending on which aldehyde has reacted. The adjacent unit of formula V in the chain may contain the same R group (either $R^1$ or $R^2$ as appropriate) or the other R group out of the two possibilities $R^1$ or $R^2$, and similarly, the one next to that may contain $R^1$ or $R^2$, the next unit of formula V may contain $R^1$ and $R^2$ and so on.

Thus it is possible to have chains of the formula under conditions of use, and furthermore the membranes will not reject certain solutes very satisfactorily. If the polyvinyl alcohol is of too high a molecular weight there are problems in making solutions of the reactants in order to prepare the coacetal resins and problems in preparing solutions for casting the membranes, as well as the membranes themselves being of poor quality. Thus, the polyvinyl alcohol should preferably have a molecular weight between ½ million and 1 million. It will be appreciated that these limits are somewhat arbitrary and merely embrace the preferred range of materials rather than defining what will work and what will not work.

Also it is found that the presence of residual acetoxy groups in the co-acetal resins deleteriously affects the properties of the membranes. In the final condensation reaction between the polyvinyl alcohol and the aldehydes, at least 25% of the side groups on the polyvinyl alcohol chain should be present as free hydroxy groups rather than acetoxy groups, but preferably 85% to 100% of the groups should be hydroxy groups.

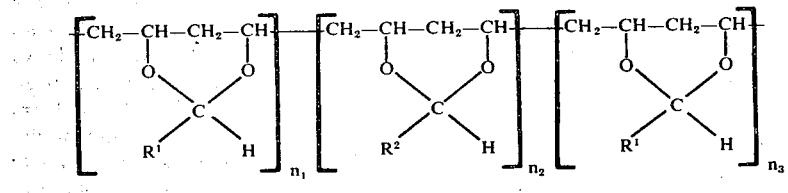

where $n_1, n_2, n_3 \ldots$ are integers, and $R^1$ and $R^2$ are different and are the organic groups present in the original aldehydes. One of $R^1$ and $R^2$ may be a hydrogen atom but otherwise the term organic group is to be interpreted in its usual sense as meaning a carbon containing group.

Also, allowing for the fact that some hydroxy groups in the original polyvinyl alcohol chain may be unreacted with an aldehyde, and that there may be some acetoxy groups remaining from the incomplete hydrolysis of polyvinyl acetate, chains of the general formula

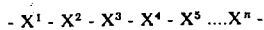

may be present where $X^1, X^2, X^3, X^4, X^5$ et cetera to $X^n$ are the same or different and each is selected from the groups

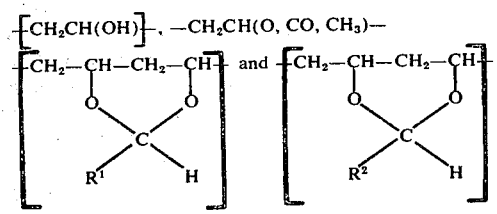

provided that the last two mentioned groups are definitely present as the major components of the chain.

As far as the chemical reaction of an aldehyde with polyvinyl alcohol to produce a polyvinyl co-acetal resin is concerned, there are no unexpected limitations on the choice of aldehyde or starting polyvinyl alcohol. However, to obtain polyvinyl co-acetal resins which are useful in the formation of membranes, there are limitations.

Firstly, it is found that if the polyvinyl alcohol is of too low a molecular weight the resulting membranes are mechanically weak and will disintegrate too easily Most of the so called fully hydrolysed polyvinyl alcohols which are commercially available have 98% or more of the acetoxy groups removed and replaced by hydroxy groups and recently some nominally 100% hydrolysed forms have become available. These are the preferred polyvinyl alcohols to react with the aldehydes. Alternatively, the polyvinyl alcohol may be prepared in situ from polyvinyl acetate but in this case it is preferred that the acetate be fully hydrolysed to the alcohol before the acetal condensation reaction occurs so that as few acetoxy groups as possible are left in the co-acetal products. It is possible to have at least one of the necessary aldehydes present in the hydrolysis medium, and carry out simultaneous hydrolysis of polyvinyl acetate to polyvinyl alcohol and conversion to acetal but it is preferred to carry out the reactions sequentially. Thus, it is preferred to start with polyvinyl alcohol in the acetal condensation reaction, whether this is prepared in situ or it is added ready made.

Whereas it is preferred to exclude acetoxy groups from the co-acetal resin products some hydroxy groups may be left. The permeability of the membranes tends to be reduced by the presence of such hydroxy groups, probably due to a closer packing of the molecules but the membranes tend to be hydrophilic. Membranes made from coacetals having 20% of residual hydroxy groups are quite satisfactory and those having up to 80% groups could be made to work in some respects. Preferably, less than 50% of the side chains in the polyvinyl co-acetal resins are present as hydroxy groups.

As far as the choice of $R^1$ and $R^2$ in the co-acetal products are concerned, it is found that certain aryl groups and very bulky organic groups including very long alkyl chains, do not give very satisfactory membranes. Highly rubbery polymers seem less suitable in the production of membranes because they can compress under the pressures encountered during use, thereby reducing solvent flux or permeability, and so those groups which are known in polymer technology to have such effects should be avoided. In general $R^1$ and $R^2$ (which must be different) may be a hydrogen atom or an aliphatic or aromatic or mixed aromatic-aliphatic group and there may be unsaturated links present in the aliphatic groups. Preferred aldehydes to give co-acetals with especially desirable membrane properties include formaldehyde, the lower alkylaldehydes containing up to 6 carbon atoms in the alkyl group (e.g. propionaldehyde has an alkyl group containing 2 carbon atoms), crotonaldehyde and cinnamaldehyde.

Particularly suitable combinations of starting aldehydes to give rise to polyvinyl co-acetal copolymers with advantageous properties in the formation of membranes are as follows:

| | | |
|---|---|---|
| propionaldehyde | : | cinnamaldehyde |
| acetaldehyde | : | cinnamaldehyde |
| acetaldehyde | : | butyraldehyde |
| propionaldehyde | : | isobutyraldehyde |
| propionaldehyde | : | crotonaldehyde |
| formaldehyde | : | propionaldehyde |

The first 4 pairs are particularly preferred.

The actual reaction conditions are the normal ones to be expected in the production of an acetal. Thus the polyvinyl alcohol and the aldehyde should be bought into intimate contact, preferably in solution, and for the reaction to proceed to a reasonable extent in a reasonable time the influence of heat is needed. The polyvinyl alcohol is preferably in solution in a solvent which will also dissolve the reactant aldehydes.

Aqueous dimethylsulphoxide is for example such a solvent. The aldehyde is then added and the mixture warmed for a prolonged period. It is then cooled and poured into water or other liquid to precipitate the polymer. It can be purified by separating it and dissolving it in a suitable organic solvent such as acetone/methyl isobutyl ketone and then reciprocating it from water.

An alternative route to the polyvinyl co-acetals of this invention could use an acyl anhydride in place of an aldehyde. However, the use of aldehydes is convenient and is preferred.

Yet a further modification to the preparative sequence would be to prepare a polyvinyl acetal wherein there were a large number of residual hydroxy groups and then produce membranes, or at least casting dopes for membranes from this acetal and convert the hydroxy groups to different acetal groups at this stage.

It is also found that it is highly desirable to introduce a degree of cross linking of the co-acetal polymer by the use of a di-aldehyde such as acrylaldehyde, succinaldehyde or glutaraldehyde. Only about 3% of the available groups need to be cross-linked in this way, and a preferred reagent is glutaraldehyde. The cross linking may be carried out at any stage after the co-acetal has been formed but a suitable and preferred time would be to cross-link the cast membrane. It will be appreciated that the cross linking stage is not an obligatory one but merely gives better resins for certain applications.

The membranes according to the invention may be varied in a considerable number of ways. The chemistry of the individual polymers may be varied such as by the use of different R groups in the acetal structures, the choice of molecular weight in the starting polymers, the amount of residual hydroxy groups, and the degree of cross linking. Furthermore, the structure of membranes made from the polymers can be varied by physical techniques in the preparation of the membranes, which factors are discussed in later paragraphs. Thus a whole series of membanes may be prepared having different flux rates, solute rejection factors, permeability and porosity and such variables. It is because of this versatility in membrane formation that the polymers of this invention are useful.

Membranes are produced from the new polymers by techniques which are already known in the production of semi-permeable membranes from other known film forming materials.

A typical sequence of events is:
1. Produce a solution of the polymer.
2. Cast the solution onto a surface to form a film.
3. At least partially evaporate off the solvent, or allow the film to consolidate.
4. Contact the film which is now solid (or in the form of a highly viscous liquid) with another liquid which does not dissolve the polymer but which penetrates into the film structure.

Stage 1. The choice of solvent is not simply any liquid which will dissolve the polymer without chemically reacting with it, but is modified by the requirements of subsequent stages. Thus, if it is desired to evaporate the solvent rapidly at stage (3) without the use of heat and/or vacuum then a highly volatile solvent is needed, whereas if it is desired to control the drying over a longer period than a solvent with a relatively low vapour pressure must be used. Furthermore, mixed solvents may be used so that one can have rapid drying at first followed by slower drying. Also, whether the solvent used at this stage is soluble in the contacting liquid at stage 4 can influence the structure of the membrane obtained. Even where the vapour pressures of two solvents are similar, the chemical structure of the solvent molecules may influence the packing of the polymer molecules in the membranes obtained after stages 3 and 4 have been carried out.

Previously suggested solvents in membrane formation have included:

Ketones such as acetone and methyl ethyl ketone; alcohols such as methanol, ethanol, propanol, and isopropanol, aromatic hydrocarbons such as xylene, toluene and benzene; N,N-dialkyl amides such as dimethylacetamide and dimethylformamide, and many of the so-called powerful organic solvents such as dimethylsulphoxide and triethylphosphate. Also some of the powerful solvents used in the paint industry as paint strippers and the like are useful solvents for membrane casting. These include various di-ether compounds related to ethylene glycol and known by trade names such as Diglymers and Digols.

The solution of the polymer may also contain a swelling agent or pore producing agent by which is meant an agent which causes the membrane obtained after stage 4 to be less densely packed or more open in structure. Usually, these will be materials which are soluble in the liquid used in the contacting stage (4) and they may themselves be liquids or solutions of a solid in a liquid. Water is such a swelling agent as are aqueous solutions of various salts including zinc halides, common salt, magnesium perchlorate, and various organic liquids such as formamide and some ketones. Lactic acid has also been found to have a useful effect. Obviously the swelling agent has to be compatible with the solvent used for the polymer and this usually means soluble in it and inert. The terms solvent, swelling agent, liquid carrier, pore producing agent and others used in the art are not mutually exclusive since one material may carry out several functions.

We have found that a particularly useful solvent is a 3 component mixture containing dimethylsulphoxide, or dimethylformamide or other highly polar solvent, acetone, and lactic acid. Lactic acid has a marked effect on the properties of the membranes but its presence in the mixture tends to adversely affect solubility. It may be left out of the mixture leaving dimethylsulphoxide plus acetone also as a useful solvent for casting.

Stage 2. Techniques for producing films from polymers in solution are well known and include spraying, painting, smearing, rolling, exuding, running, dripping or otherwise depositing a film of liquid onto a solid support or base medium. The support medium may be a smooth flat surface such as glass or other plate or a tube or other shaped surface depending on what form of membrane is required.

For flat membranes a doctor blade technique is usually used, exuding or smearing a thin film onto a smooth flat plate from which the membrane can later be stripped. The thickness of film required at this stage will depend on the concentration of the polymer solution, amount of swelling agent incorporated and other factors, but a typical doctor blade opening would be 0.01″ to give a film of similar thickness.

A particularly preferred technique used in the production of tubular membranes is to draw a bob up a vertical tube leaving a smeared coating of the casting dope on the inside of the tube. By this technique the atmosphere around the membrane during casting is controlled because the composition of gas or vapour entering the open base of the tube can be controlled and the top will be closed by the bob or plug until it is withdrawn. Hot dope or casting solution can be used easily with this technique.

As a generality the so called casting stage can be carried out in a controlled atmosphere, for example surrounded by solvent vapour, or in open atmosphere where air contacts the film as soon as it is cast. Also temperature can be varied and different membranes will result from casting at low temperatures, for example around ambient (say 10° – 25°C) or at elevated temperatures (say 40°–70°C). It is important to prevent bubbling due to vapourisation of the casting dope solvent so one would not exceed the boiling points of the solvents and therefore hot casting is dependent on the solvent chosen. For the preferred solvents hot casting is around 50°–70°C.

Higher temperatures tend to favour more closed or compacted structures. However, an equally important factor is the dwelling time after casting and whether any contact with vapours is permitted or air drying occurs.

Stage 3. The drying stage where the solvent is evaporated off is not an obligatory step, but its effect can be quite critical. It is necessary to consider the several variable factors which are interrelated to predict the effects. For any given solvent a higher temperature increases the vapour pressure and so a controlled atmosphere is needed to use the effect of dwelling time at any given temperature independently of the rate of evaporation. Saturated solvent vapour atmospheres may be used, or else a vacuum above the film or air blown over the film may be used as extreme illustrations of factors influencing evaporation rate.

Fairly high rates of vaporisation tend to give rise to closed structures, whereas longer times lead to more open pore structures which are less permeable to liquids, but such observations must be correlated closely with the vapour pressures of solvents used to formulate casting dopes from copolymers. Clearly in order to have slow drying of highly volatile solvents it is necessary to either cool the mixture or have a controlled atmosphere of solvent vapour. Thus, drying times can be anything from seconds to several hours depending on temperature, solvent system, and amount of drying required.

In some techniques it is required to completely remove the solvent whereas in others a still slightly tacky film is used for stage 4.

With the preferred dimethylsulphoxide/acetone solvents of the invention, the drying stage can be omitted or kept to a minimum. With other solvents, periods of 2–25 minutes or 2–5 hours are used depending on the type of structure required.

Stage 4. After the bulk of the solvent has been removed or the film has consolidated the film is immersed in or contacted with another liquid in which the polymer is not soluble. Usually this liquid will be the type subsequently to be treated using the membrane, and so almost invariably the contacting liquid will be an aqueous medium. Pure water is the usual liquid, but mixed solvents may be added, for example alcohols, or small quantities of surface active agents such as detergents may be added.

In general one seeks to produce as thin a membrane as possible which still has sufficient mechanical strength to be usable. Thicker membranes tend to have lower fluxes, but often the ability to reject solutes is not dependent on membrane thickness. This is probably because the membranes are anistropic with a thin surface barrier layer determining the rejection or filtering characteristics for the membrane.

Further variations can be made in the casting technique to vary the structures of the membranes: for example it is possible to cast the dope directly into water, to put hot cast membranes into cold water with no drying stage and so on.

Membranes produced by the methods discussed above can be incorporated into standard modules or apparatus for purification. It will be appreciated that osmotic pressures can be very high and so for reverse osmosis applications and hyperfiltration under pressure, the membrane needs to be supported on a rigid porous matrix.

Having now described the invention in general terms, the following examples illustrate particular working embodiments.

PREPARATION OF POLYVINYL PROPIONAL: CINNAMAL

EXAMPLE 1

Polyvinyl acetate (150g) was suspended in a mixture of dimethylsulphoxide (DMSO), water and ethanol (750g; equal parts by weight) to which 5g of concentrated sulphuric acid had been added as a catalyst for hydrolysis. Slow dissolution occurred. The mixture was warmed and to it, 75g propionaldehyde was added. After stirring for 4 hours, 75g cinamaldehyde was added and heating continued at 80°–85°C for a further three hours. After cooling, the mixture was poured into a methanol/water mixture (1 liter, equal volumes containing 10g sodium bi-carbonate dissolved) and the whole mixture was stirred vigorously. A white copolymer was recovered by filtering through a coarse sintered glass filter and it was washed with water until all odour of acetic acid disappeared. For further purification, the product (224g) was redissolved in an acetone/methyl isobutyl ketone (MIBK) mixture, reprecipitated in methanol/water and filtered and dried in a vacuum oven. The product was then dried finely and was ready for formulation into casting dope mixtures.

EXAMPLE 2

Preparation of Polyvinyl Acetal: Cinnamal

Polyvinyl alcohol (140g) (Dupont Elvanol grade), was dissolved in a mixture of 600g water and 200g dimethylsulphoxide (DMSO) to which 5g concentrated hydrochloric acid had been added as a catalyst, the mixture being warmed to 70°C. Acetaldehyde (120g) in DMSO (50g) was added to the reaction mixture cooled to 40°C. After 1 hour's reaction, cinnamaldehyde (80g) was added and the mixture warmed to 80°C. The reaction was continued for 7 hours with continuous stirring, then the mixture was allowed to cool, The product partially came out of solution and was recovered by pouring the reaction mixture into a stirred mixture of 1.5 liters iced water containing 25g of dissolved $NaHCO_3$. The copolymer product (183g) was obtained by filtering the mixture through a glass fibre mat filter and washing it copiously with 3% aqueous $NaHCO_3$ solution and finally with water until the solid was odourless. The product was reprecipitated from methyl ethyl ketone/methyl isobutyl ketone mixture (50:50 parts by volume) and filtered and washed from the bicarbonate solution as before. After drying for 48 hours in a vacuum drier at 40°C, the product was ready for formulation into casting dopes and subsequent cross-linking reactions.

EXAMPLE 3

Alternative preparation of polyvinyl - propional: Cinnamal.

Polyvinyl acetate (500g) was suspended in a mixture of glacial acetic acid (200g) and water (350ml) containing concentrated sulphuric acid (20g). The mixture was warmed to 55°C and stirred for 6 hours to assist solution of the polymer. Propionaldehyde (150g) was added drop by drop over a 60 minute period after the reaction temperature had been raised to 80°C. The reaction proceeded for a further 12 hours at 70°–80°C. with stirring. Cinnamaldehyde (200g) was then added drop by drop over 60 minutes to the mixture and the reaction was further warmed at 70°–80°C for 12 hours.

The mixture was then allowed to cool and the resulting viscous slurry was poured into 1 liter of methanol mixed with 1 liter of distilled water. After washing the precipitate with 3% sodium bicarbonate solution, pale yellow copolymer was recovered by filtering the mixture through a coarse sintered glass filter. The product (224g) was washed with water until all acetic acid odour disappeared. The product was further purified by redissolving the product in acetone/methyl isobutyl ketone mixture, reprecipitating with methanol/water mixture and it was then filtered and dried in a vacuum oven. Finally the copolymer was dried over phosphorus pentoxide and ground into a fine powder for formulation into dope mixtures for membrane casting.

MEMBRANE CASTING

A casting dope formulation was made up from the following solvents and swelling agents:

| | |
|---|---|
| Polyvinyl-propional : Cinnamal Copolymer : | 160g |
| Dimethylsulphoxide | 720g |
| Lactic acid | 25g |
| Acetone | 50g |

Lactic acid was added in 5 equal portions to the dimethylsulphoxide until the exothermic reaction ceased. Copolymer was then added to the solvent mixture continuously stirred in a blender until all the powder was wetted by solvent and a viscous suspension resulted. The suspension was then poured into the acetone in a suitable container, sealed and agitated until solution occurred.

The casting dope was then made into a flat plate membrane by casting onto a polished glass surface and immediately afterwards the coated plate was immersed in water at 12°C. The doctor knife opening used to spread the film was 0.01 inches and the resulting film had a wet thickness of 0.006 inches and was tough and pliable.

Tested for flux in a suitable flat-plate rig in which diluted whey was circulated (1% solids) at high speed, the membrane gave 100% rejection of suspended solids at fluxes of 180 U.S. gallons per minute for applied pressure of 80 p.s.i.g. and feed temperature of 17°C.

When this dope was cast in tubular form inside a porous support tube, at a rate of 3 feet in 60 seconds, it gave a good adherent film, 0.005 inches thick. This film was gelled by exposure to water at 4°C for 120 seconds. Film pores were subsequently shrunk by treating the membrane surface in a steam and water vapour generator at 75°C for 5 minutes. The resulting membranes showed rejection properties towards 1% aqueous sodium chloride solution of 46% with fluxes of 7.8 U.S. gallons/square foot/day at 400 p.s.i.g.

EXAMPLE 4

Alternative Preparation of Polyvinyl - acetal: cinnamal.

Polyvinyl alcohol (440g) was suspended in a glacial acetic acid (800g), water (600g) and dimethylsulphoxide (200g) mixture containing 17g concentrated hydrochloric acid catalyst. The mixture was stirred at 50°C for 3 hours prior to adding the further reactants in a 5 liter reaction flask fitted with condensers. Acetaldehyde (150g) dissolved in dimethylsulphoxide (300g) was added to the stirred mixture over a 2-hour period, then the temperature was raised to 80°C and the mixture was stirred for 7 hours. Cinnamaldehyde (195g) was then added drop by drop to the reaction mixture at 80°C. and the reaction mixture was maintained at this temperature for a further 3 hours, becoming gradually straw-colored and precipitating the co-acetal product. The yield of product was recovered by pouring the cooled mixture into ice-water (1.5 liters) containing sodium bi-carbonate (80g). The slurry was then filtered using a glass-fibre mat filter, the residue was washed with 3% aqueous solution of sodium bicarbonate and then with water until the product granules were odourless. The granules were dissolved in a 50:50 volume mixture of methyl ethyl ketone/methyl isobutyl ketone, reprecipitated with water in a stirred blender and filtered, washed and dried for 48 hours in a vacuum oven.

After drying over phosphorus pentoxide, the granules were ground to give a pale yellow powder (276g) for formulation into membrane casting dopes.

PREPARATION OF MEMBRANE

A formulation was made up for dope casting, containing the following ingredients and proportions:

| | |
|---|---|
| polyvinyl-acetal : cinnamal copolymer : | 150g |
| Dimethylsulphoxide | 750g |
| Acetone | 25g |

Copolymer was added to the dimethylsulphoxide with continuous stirring until all the solid was wetted, giving a viscous slurry. This slurry or "dope" was then agitated on a roller mixer. The dope was warmed to 45°C during mixing over a 48 hour period, then acetone was added to reduce the mixture viscosity, and mixing was continued for a further 6 hours.

Cast in a tubular casting apparatus, this dope gave an adherent film in a support tube having a wet thickness of 0.005 inches after gelling with water at 4°C. The resulting membrane gave a water flux of 128 U.S. gals/square foot/day at 16°C and 80 p.s.i.g. test pressure. When tested with whey solutions containing suspended solids of 1.6% and 6%, permeate fluxes ranged from 5.6 to 8 U.S. gals/square foot/day at 16°C with over 90% protein rejection and a pale yellow permeate colour.

EXAMPLE 5

Preparation of Polyvinyl — acetal : butyral.

Polyvinyl alcohol (Dupont Elvanol 72-60) 400g was stirred into a mixture of glacial acetic acid (2000g), water (350 ml) and concentrated sulphuric acid (20g). The mixture was stirred and warmed to 45°–50°C for 4 hours to encourage solution and dispersion of the polymer. After 4 hours, the viscosity of the mixture had increased. Acetaldehyde (29g) in dimethylsulphoxide (200g) was added drop by drop to the stirred reaction mixture over 60 minutes, then the reaction proceeded for 12 hours at 55°–60°C. n-Butyraldehyde (150g) in dimethylsulphoxide (200g) was added drop by drop to the stirred mixture as before over a 90 minute period. There was a slight evolution of heat due to an exothermic reaction and the reaction mixture was maintained at 65°–75°C for a further 12 hours. During this period the product partially precipitated. The mixture was cooled, and the product recovered by precipitation into water at 4°C containing sodium bi-carbonate (60g) from which it was filtered onto a coarse glass sintered support. It was washed until odourless, then dried in a vacuum drier at 40°C to give a pale grey granular product (245g), which was later ground to a white powder after drying over phosphorus pentoxide. The product appeared to be slightly hygroscopic, and was therefore rigorously dried before using in membrane casting dope formulations.

MEMBRANE PRODUCTION FROM POLYVINYL-ACETAL:BUTYRAL.

A casting dope formation was made up using the following ingredients:

| | |
|---|---|
| Polyvinyl acetal : butyral copolymer | 150g |
| Dimethylsulphoxide | 700g |
| Lactic acid | 25g |
| Acetone | 40g |

Lactic acid was added drop by drop to the dimethylsulphoxide until the exothermic reaction ceased. The copolymer was then added to the stirred mixture until all the powder was wetted. After roller-mixing for 48 hours at 30°C, the viscous dope was diluted with acetone and mixing continued for 12 hours. After de-aeration, the dope was ready for casting. A 4 ft length of tubular support was used for casting a 0.006 inches wet thickness film of copolymer on its inner surface. After 2 minutes solvent drying following casting, the membrane was exposed to water for 60 seconds at 4°C. The tube was then immersed in water at 4°C for 30 minutes and tested for water flux:

| Applied Pressure (p.s.i.g.) | Flux (U.S. gals/square foot/day |
|---|---|
| 50 | 185 |
| 100 | 218 |
| 200 | 600 |

The membrane was then tested for permeate flux with a feed for 6% whey. As expected, flux decreased with increasing feed concentration, but flux increased with increasing feed temperature. Flux also increased favourably with increasing feed circulation rate and fluxes levelled off above 300 psi operating pressures suggesting that concentration polarisation at the membrane surface is responsible for observed flux limitations.

| Feed Flow Rates lb/hr | Applied Pressure p.s.i. | Permeate Flux US Gals/Sq.ft./day. | Feed temperature in degrees centigrade. |
|---|---|---|---|
| 1200 | 200 | 5.32(slightly cloudy) | 8.0 |
| 1000 | 400 | 8.26(slightly cloudy) | 8.0 |
| 5000 | 220 | 12.1(clear) | 19 |
| 5000 | 240 | 13.24(clear) | 19 |

Brief runs at 40°C feed temperatures indicated higher permeate fluxes with clear, straw-colored products and excellent protein retention.

EXAMPLE 6

Preparation of polyvinyl - propional:isobutyral

Polyvinyl alcohol (Dupont Elvanol 71-30), (500g) was suspended with stirring in a reaction flask containing a mixture of glacial acetic acid (200g), water (400g), butanol (1000g) and concentrated sulphuric acid (20g). The mixture was stirred for 4 hours at 55°–60°C until partial solution of the polymer occurred. Propionaldehyde (200g) was added drop by drop to the reaction mixture over a 30 minute period, then the reaction was stirred at 60°C for 6 hours. Isobutyraldehyde (200g) in n-butanol (500g) was added to the stirred reaction mixture then heating was continued for a further 12 hours. The product was recovered by cooling the reaction mixture, pouring the product into iced water at 4°C and neutralising with sodium bi-carbonate solution. After reprecipitation washing and drying, product yield was 124g.

Preparation of membrane

A small quantity of dope was made from this product and formulated as follows:

| | |
|---|---|
| Polyvinyl-propional : isobutyral copolymer | 30g |
| Dimethylsulphoxide | 160g |
| Acetone | 4g |

After casting in tubular form and pore closure in iced water at 4°C followed by water treatment at 75°C for 3 minutes, a membrane was obtained having high rejection properties towards 1% sodium chloride, showing more than 99% rejection at about 1.4 U.S. gals/square foot/day flux.

I claim:

1. A semi-permeable membrane for use in the treatment of feed solutions by reverse osmosis, ultrafiltration or related techniques consisting essentially of a polyvinyl coacetal resin having a backbone chain of the general formula

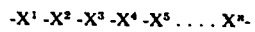

wherein each X of $X^1, X^2 \ldots X^n$ is selected from the group consisting of hydroxy-bis-methylene —$CH_2$—$CH(OH)$—,
acetoxy-bis-methylene —$CH_2$—$CH(OCO.CH_3)$—,
a first acetal group

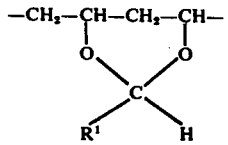

and a second acetal group

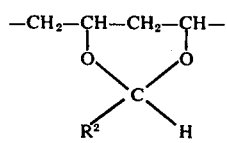

provided that said first and second acetal groups are both present and together comprise 25 to 100% of the chain, said groups $R^1$ and $R^2$ being different and each being selected from the group consisting of a hydrogen atom, straight or branched alkyl or alkenyl groups containing up to 6 carbon atoms and phenylalkyl or phenylalkenyl groups wherein the alkyl or alkenyl group is straight or branched and contains up to 6 carbon atoms.

2. The semi-permeable membrane of claim 1 which is of tubular form.

3. The semi-permeable membrane of claim 1 which is of flat form.

4. A semi-permeable membrane according to claim 1, wherein the two acetal groups comprise 85 to 100% of the chain.

5. A semi-permeable membrane according to claim 1, wherein the amount of acetoxy-bis-methylene groups in the chain is substantially zero or at the most up to 2% of the chain.

6. A semi-permeable membrane according to claim 1, wherein $R^1$ and $R^2$ are different and are selected from a hydrogen atom, and methyl, ethyl, propyl, isopropyl, prop-1-enyl and phenylethenyl groups.

7. A semi-permeable membrane according to claim 6, wherein the polyvinyl co-acetal resin is selected from polyvinyl propional - cinnamal, polyvinyl acetal - cinnamal, polyvinyl acetal - butyral, and polyvinyl propional - isobutyral.

* * * * *